C. RADIGUER.
LIQUID FUEL BURNER.
APPLICATION FILED DEC. 19, 1913.

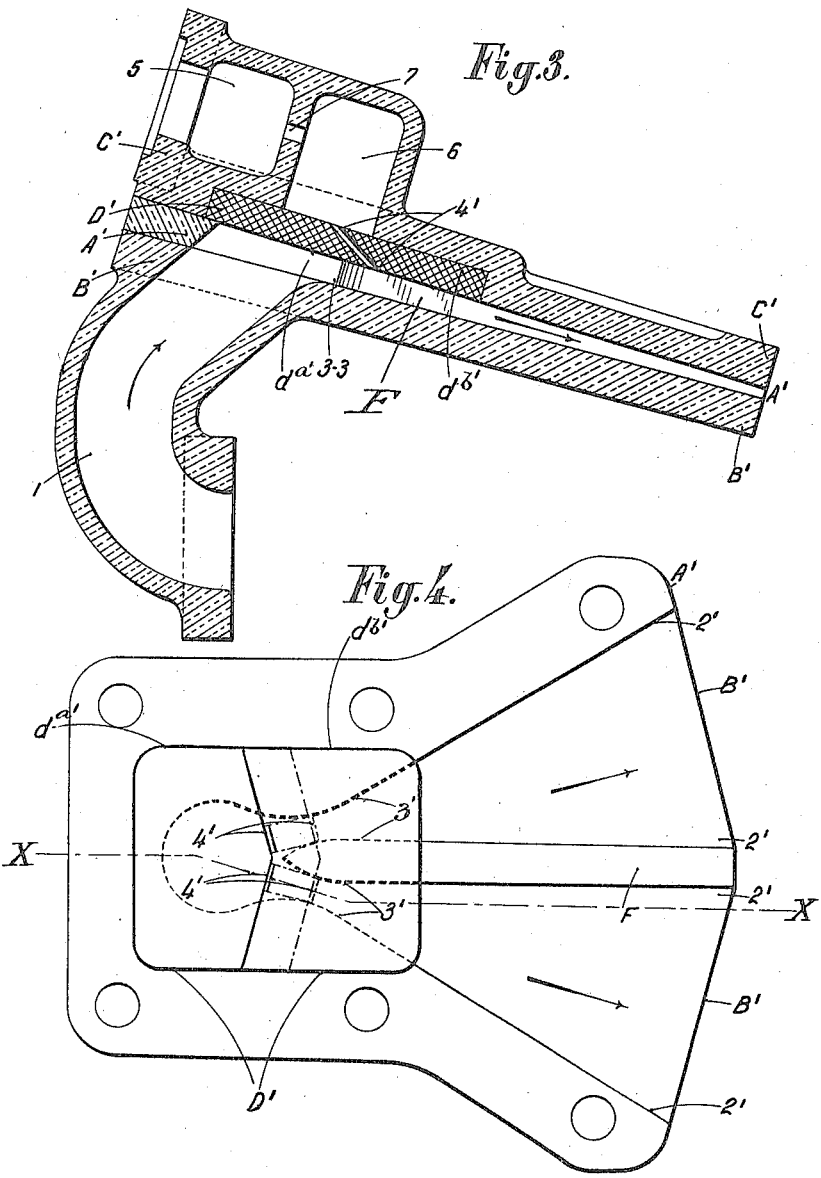

1,180,538.

Patented Apr. 25, 1916.
3 SHEETS—SHEET 3.

WITNESSES

INVENTOR

UNITED STATES PATENT OFFICE.

CHARLES RADIGUER, OF ST.-DENIS, FRANCE, ASSIGNOR TO SOCIÉTÉ ANONYME DES ETABLISSEMENTS DELAUNAY-BELLEVILLE, OF ST.-DENIS, FRANCE, A CORPORATION OF FRANCE.

LIQUID-FUEL BURNER.

1,180,538.　　　　Specification of Letters Patent.　　Patented Apr. 25, 1916.

Application filed December 19, 1913. Serial No. 807,791.

*To all whom it may concern:*

Be it known that I, CHARLES RADIGUER, citizen of the French Republic, residing at St.-Denis, Department of the Seine, in France, have invented certain new and useful Improvements in Liquid-Fuel Burners; and I do hereby declare the following to be a full, clear, and exact description of the invention, such as will enable others skilled in the art to which it appertains to make and use the same.

The present invention relates to liquid fuel burners, and has for its object to provide a burner in which the compressed air and the liquid fuel are thoroughly and intimately mixed before leaving the discharge opening of the burner. In furtherance of this object, the nozzle of the burner is made relatively long, so as to insure an excellent atomization of the fuel by the compressed air.

Another object of the invention is to so construct the burner that the discharge opening may be made relatively wide, and thereby distribute the fuel jet over a wide area without sacrificing the efficient atomization of the fuel by the compresed air or the intimate mixing of the two. This is accomplished by providing the burner with two adjacent passages through each of which the air and fuel pass, the delivery orifices of said passages being in substantially the same plane, and both in conjunction being adapted to spread the fuel jet over a larger area than either of the discharge orifices, if used alone.

The invention is illustrated in the accompanying drawings, in which:—

Figure 1:
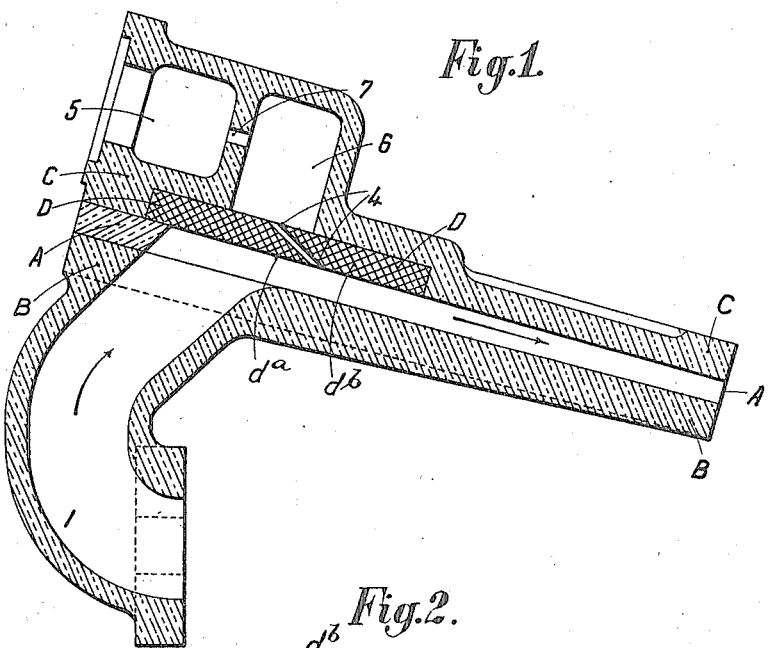
Figure 2:
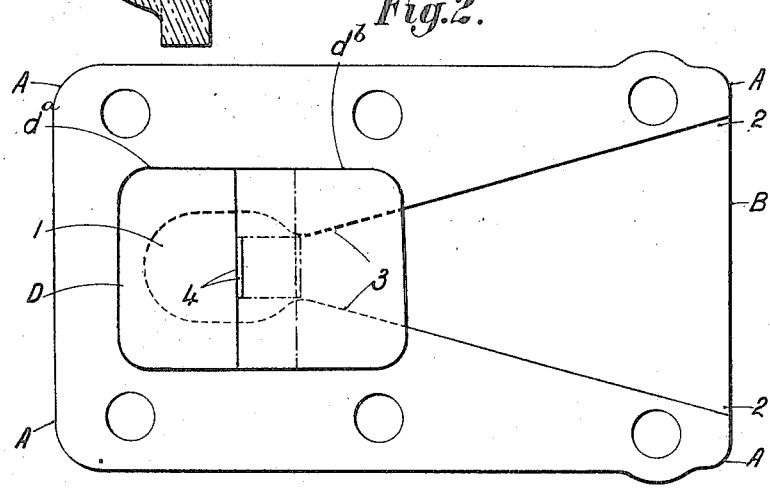
Figure 5:
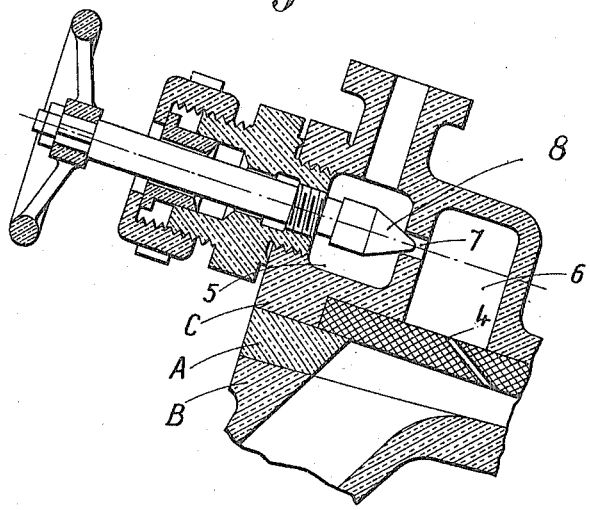

Figure 1 is a vertical longitudinal section through one form of the improved burner; Fig. 2 is a plan view of the burner shown in Fig. 1 with the top section removed, but the fuel-delivery member left in position; Fig. 3 is a vertical longitudinal section through a modified form of burner, taken on the line X—X of Fig. 4; Fig. 4 is a view similar to Fig. 2, it being a plan view of the burner in Fig. 3 with the top section removed, but the fuel-delivery member left in place, and Fig. 5 is a broken sectional view showing a controlling valve which may be associated with the fuel supplying means of the burner.

Referring to Figs. 1 and 2, the burner is made up of four main sections, A, B, C and D. The section B is the lowermost section and comprises a rectangular plate carrying the elbow-shaped compressed air inlet pipe 1. The intermediate section, or that shown at A, comprises a flat plate having a V-shaped opening therein, as shown at 2—3—2, in Fig. 2. Adjoining the V-shaped opening 2—3—2 and communicating therewith, is a suitably shaped opening which registers with the opening in the inlet pipe 1, as will be clear from inspection of Fig. 2. The section C constitutes the cover-plate, and when assembled with the sections A and B, produces an inclosed passage for the compressed air and the liquid fuel, which latter is delivered by the means now to be described.

The top section C has embedded therein a fuel delivery member D, the shape and position of which are indicated by dot and dash lines, in Fig. 2. This fuel delivery member constitutes the fourth section of the burner. It is carefully machined and is formed in two plate-like sections $d^a$ and $d^b$, the meeting surfaces of which are obliquely disposed and one of which is recessed in such a way as to provide a fuel delivery orifice 4 when the sections are assembled. The section C is so cast, or otherwise formed, as to produce two compartments 5 and 6, which communicate, by means of a passage 7. Liquid fuel is delivered under pressure to the compartment 5, and then passes through the passage 7 to the compartment 6, which serves as a moderating chamber to supply the fuel to the burner under substantially uniform pressure. The passage 7 may be controlled by means of a valve 8, (Fig. 5), if so desired.

The liquid fuel leaves the orifice 4 at low velocity, and the compressed air supplied through the inlet pipe 1 carries the liquid fuel forwardly through the passage 2—3—2 and delivers it through the discharge opening of the burner. In passing through the passage 2—3—2, the air and the fuel are intimately mixed and the fuel is thoroughly atomized.

In the modification of Figs. 3 and 4, the burner is made up of sections similar to the sections of Figs. 1 and 2, except that the extremital portion of each section is flared so that the burner may deliver the fuel over an area of greater width than the burner shown in Figs. 1 and 2. To accomplish this, the intermediate section A′ is provided with an opening, the delivery end of which is much wider than the delivery end of the corresponding opening shown in Fig. 2. A bar or rib F, secured to the lower section B', divides this passage, when the sections are assembled, into two adjacent passages 2'—3'—2', each of which is completely inclosed by the sections of the burner, and each of which communicates with the inlet pipe 1. In this instance, the fuel delivery member D' is provided with two fuel delivery orifices, one for each fuel passage 2'—3'—2. Both of the orifices 4' communicate with the fuel compartment 6. It will, therefore, be seen that the burner is provided with two adjacent delivery orifices, the combined operation of which spread the fuel issuing from the burner over a wide area, and yet the thorough atomization of the fuel is not sacrificed, nor is the intimate mixing of the air and the fuel sacrificed. As a matter of fact, the atomization is better effected in the form of the device shown in Figs. 3 and 4, than that shown in Figs. 1 and 2, since a greater quantity of air may be used for the same quantity of fuel. This also insures a more complete combustion.

It will be noted that in both forms of the burner, it is so constructed that the fuel comes into contact only with machined surfaces, which surfaces are capable of being easily cleansed, and readily reached, as the burner may be quickly taken apart and the interior surfaces thus exposed. The carefully machined fuel-delivery members shown in Figs. 1 and 3 at D and D' respectively, are embedded in the upper section, as shown in these figures, and when the top section is removed, would very likely stay in position and be removed with the top section, but in Figs. 2 and 4, which illustrate plan views of the burner with the top section removed, these fuel-delivery members are left in position to show their appearance in plan view and their position with respect to the other parts of the burner.

What I claim is:—

1. A liquid fuel burner comprising a lower section, an upper section and an intermediate section, said intermediate section having an opening diverging toward the delivery orifice of the burner and extending completely through said intermediate section, the lower and upper sections being adapted to form with the intermediate section and its diverging opening, an interior passage, a carefully machined and smooth fuel-delivery member embedded in the upper section and having a fuel-delivery orifice discharging into said interior passage, means to deliver fuel to said orifice, and means to deliver air to said interior passage.

2. A liquid fuel burner comprising a lower section, an upper section and an intermediate section, said intermediate section having an opening diverging toward the delivery orifice of the burner and extending completely through said intermediate section, the lower and upper sections being adapted to form with the intermediate section and its diverging opening, an interior passage, a carefully machined and smooth fuel-delivery member embedded in the upper section and having a fuel-delivery orifice discharging into said interior passage, means to deliver fuel to said orifice, comprising a fuel compartment associated with said upper section and positioned over said fuel-delivery member, means to regulate the supply of fuel to said compartment, and means to supply air to said interior passage.

3. A liquid fuel burner comprising a lower section, an upper section and an intermediate plate-like section having an opening passing completely therethrough and diverging toward the delivery orifice of the burner, a central longitudinal rib carried by the lower section, whereby when the sections are assembled two independent interior passages are formed having their delivery orifices in substantially the same plane and adapted to discharge in diverging directions, and means to deliver independent supplies of air and fuel to each of said interior passages.

In testimony whereof I affix my signature in presence of two witnesses.

CHARLES RADIGUER.

Witnesses:
EMILE BERTRAND,
EMILE KLOT.